United States Patent [19]

Ito et al.

[11] 3,975,707

[45] Aug. 17, 1976

[54] DEVICE FOR CONTROLLING THE DENSITY OF PRINTING CHARACTERS

[75] Inventors: Matsutoshi Ito, Narashino; Tatsuo Nishikawa, Tachikawa; Kano Takeshita, Tokyo, all of Japan

[73] Assignee: Canon Kabushiki Kaisha, Tokyo, Japan

[22] Filed: Feb. 10, 1975

[21] Appl. No.: 548,759

Related U.S. Application Data

[63] Continuation of Ser. No. 400,736, Sept. 26, 1973, which is a continuation-in-part of Ser. No. 132,056, April 7, 1971, abandoned.

[30] Foreign Application Priority Data

Apr. 13, 1970 Japan .............................. 45-31846

[52] U.S. Cl. .............................. 346/76 R; 219/216

[51] Int. Cl.² .............................. G01D 15/10

[58] Field of Search .................. 346/76 R; 219/216; 178/30

[56] References Cited

UNITED STATES PATENTS

| | | | |
|---|---|---|---|
| 2,922,688 | 1/1960 | Boyan | 346/76 R |
| 3,139,026 | 6/1964 | Meckstroth et al. | 346/76 R X |
| 3,577,137 | 5/1971 | Brennan | 219/216 X |

*Primary Examiner*—Joseph W. Hartary
*Attorney, Agent, or Firm*—Fitzpatrick, Cella, Harper & Scinto

[57] ABSTRACT

To adjust the density of alphanumeric to be thermally printed by a thermal printer, a time duration for applying the row or column drive current to the selected dot elements in a thermal head is varied so as to vary a time duration for which the selected dot elements are energized, to thereby change the quantity of heat dissipated therefrom depending upon the environmental temperature, the thermal characteristics and aging of thermally sensitive paper and so forth. The drive current flowing duration may be varied by varying a cycle of the drive current signals to be sequentially applied to the row or column drive lines of a dot element matrix circuit through a character generator. In one embodiment of the present invention, the cycle of the drive current signals may be varied by the frequency division or count down of the clock pulses with a variable pulse repetitive rate used in an electronic computer.

3 Claims, 13 Drawing Figures

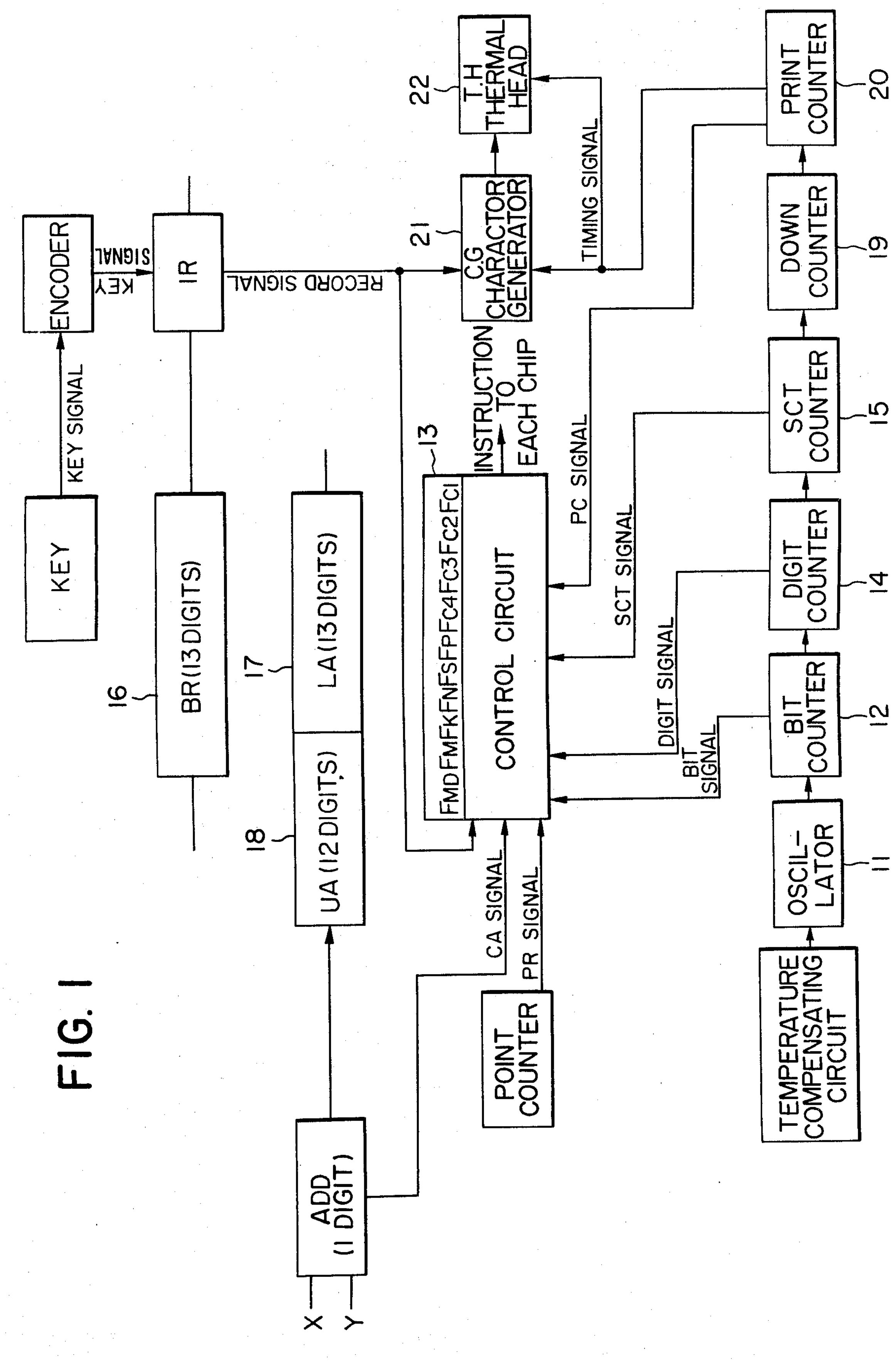
FIG. I

INVENTOR.

BY

INVENTOR.

BY

DEVICE FOR CONTROLLING THE DENSITY OF PRINTING CHARACTERS

This is a continuation of Application Ser. No. 400,736, filed Sept. 26, 1973, which, in turn, is a continuation-in-Part of Application Ser. No. 132,056, filed Apr. 7, 1971, now abandoned.

BACKGROUND OF THE INVENTION

The present invention relates to generally a thermal printer of the type in which the current is made to flow through a resistor so as to generate heat thereby blackening in a desired pattern a thermally sensitive paper located in closely spaced-apart relation with the thermal head to print desired characters and more particularly to a device for use with a thermal printer of the type described for controlling the density of characters to be printed.

In some small-sized electronic computers such as desk-top calculators, operands and the results of operation are generally indicated by a number of displaying tubes or the like arrayed in one row on the computer. In another kind of computer printers are additionally incorporated so that operands or numerals to be operated and the results of operation may be printed upon a rolled paper or paper tape. Such printers have an advantage in that the operands or numerals to be operated may be visually recognized and checked and the results of operation may be permanently recorded so that the printers are widely used. Of various types of printers, a thermal printer is particularly advantageous because it has no mechanical components and the number of movable parts may be minimized.

As its name implies, the thermal printer utilizes heat to print alphanumeric symbols or any other characters (hereinafter referred to as "characters" for simplicity) on a thermally sensitive paper so that it is desirable to adjust the density of characters to be printed in response to the environmental temperature, the thermal characteristics of thermo-sensitive paper, the aging thereof, the preference of an operator and the like.

One of the objects of the present invention is therefore to provide a device simple in construction and operation for adjusting the density of characters to be printed on a thermo-sensitive paper.

Another object of the present invention is to provide a device simple both in construction and operation for adjusting the density of characters to be printed for use with a printer of the type employing a thermal head which is driven by the pulse signals derived by the frequency division of the clock pulses.

Another object of the present invention is to provide a device simple both in construction and operation for adjusting the density of characters to be printed for use with a thermal printer of the type employing a thermal head comprising a plurality of dot elements.

Another object of the present invention is to provide a device simple both in construction and operation for adjusting the density of characters to be printed for use with a thermal printer of the type employing a thermal head comprising a plurality of dot elements and a character generating circuit for selecting a predetermined combination of dot elements to be driven.

SUMMARY OF THE INVENTION

Briefly stated, according to an aspect of the present invention a device for adjusting the density of characters to be printed for use with a thermal printer comprises thermal head comprising a plurality of arrayed dots the selected ones of which are heated when the current flows therethrough, character generating means for selecting a predetermined combination of dots in the thermal head, counter means associated with clock pulses, means for driving said thermal head through said character generating means and controlling a time duration of the drive current to be applied to said thermal head and means for varying the frequency of the clock pulses.

BRIEF DESCRIPTION OF THE DRAWING

FIG. 1 is a block diagram of a device for adjusting the density of characters to be printed for use with a thermal printer incorporated in a desk-top calculator;

DESCRIPTION OF THE PREFERRED EMBODIMENT

Figure 2A:
FIGS. 2*a* to 2*e* illustrate the sequence of counting down or dividing the frequency of clock pulses to a desired frequency with which thermal printing is carried out.
Figure 2B:
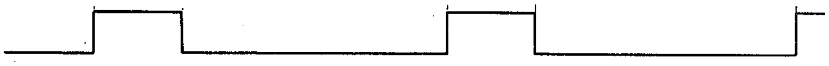
Figure 2B:
Figure 2C:
Figure 2C:
Figure 2D:
Figure 2D:
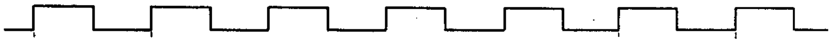
Figure 2E:
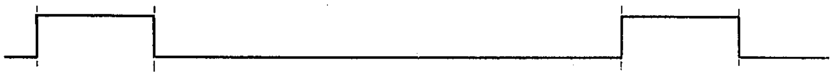
Figure 2E:

Referring to FIG. 1, all of the operation of a desk-top calculator are controlled by clock pulses generated by a clock pulse generator 11 which is in the instant embodiment, an oscillator such as not an ordinary clock pulse generator, but a multivibrator capable of varying its frequency. Means for changing this frequency may be obtained in any suitable conventional manner such as by providing a variable capacitance connected in parallel to the capacitance of an oscillator to change the frequency of the oscillator. In addition, when the oscillator, as shown in FIG. 1, is controlled by the temperature, means for varying the frequency may include an impedance element which is varied in accordance with the temperature, and which is a part of the impedance elements for determining oscillating frequency. For example, in this case, it is possible to use an oscillator such as the "Sine-Square-Wave Phase Shift Oscillator" appearing at page 520 in the book entitled "Source Book of Electronic Circuits" edited by McGraw Hill Copyright 1968, and, a thermistor may be added to the resistor connected to the base electrode of the transistor to vary the base potential of the transistor in accordance with the temperature. In this case, the added thermistor forms the temperature compensating circuit. By use of any one of the well-known means for varying the frequency, as described above, the clock pulse generator is able to operate over the range of the oscillator from 30 KHz to 60 KHz. The clock pulses from the clock pulse generator 11, which are shown in FIG. 2-*a*, are applied to a quadruple or bit counter 12 which generates one pulse every four clock pulses applied as shown in FIG. 2-*b*, the pulse width being equal to the period of one clock pulse. In this case, it is possible to use as said quadruple or bit counter 12, a counter such as the "divide - by - 5 ring counter" appearing at page 240 in the book entitled "Source Book of Electronic Circuits" edited by McGraw Hill Copyright 1968. The pulses or bit signals from the bit counter 12 are applied to a control circuit 13 which is adapted to divide and detect information every four bits of four clock pulses. The bit signals from the bit counter 12 are also applied to a digit counter 14 adapted to generate one pulse every 13 bit signals applied as shown in FIG. 2-*c*, the pulse width being equal to the period of one pulse from the bit counter 12. The digit signals from the digit counter 14 are also applied to the control circuit 13 for sampling information every 13 bit signals from the bit counter 12 and also to control the circulation of information within a register.

The digit signals from the digit counter 14 are also applied to a binary or sector counter 15 which generates one sector signal every one sector as shown in FIG. 2-*d*, the sector signal pulse width being equal to the period of one digit pulse from the digit counter 14. The sector pulses from the counter 15 are applied to a quinary counter 19 which steps down the frequency of the sector pulses to 1/5, that is generates one pulse every five sector pulses, as shown in FIG. 2-*e*, the width of one pulse from the quinary step-down counter 19 being equal to the period of one sector pulse. As a consequence one clock pulse is stepped down in frequency to $1/(4 \times 13 \times 2 \times 5)$ by the bit counter 12, the digit counter 14, the sector counter 15 and the quinary counter 19. For each of these counters, it is possible to use a counter, such as the "divide - by - 5 ring counter" appearing at page 24 in the book entitled "Source Book of Electronic Circuits" edited by McGraw Hill Copyright 1968. The pulses from the quinary counter 19 are applied to a decimal counter 20 which is a print counter for determining the printing cycle and applying PC0-PC4 count pulses out of PC0-PC9 count pulses to a character generator 21 and to a thermal head 22 as will be described in more detail hereinafter. When the time durations PC5 to PC9 are the rest time for providing a cooling time of the thermal head and a moving time of the thermosensitive paper or the thermal head, the thermal head is not energized to heat.

The bit counter 12, the digit counter 14 and the sector counter 15 are the conventional counters employed in the desk-top calculator, but the step-down counter 19 and the print counter 20 are additionally employed in accordance with the present invention. However, it should be understood that the present invention is not limited to the above counters and the frequency division methods of the type described above and that other suitable means may be employed so that the frequency of the clock pulses may be stepped down to a desired frequency so as to determine one printing cycle (in the instant embodiment the decimal print counter being employed as described above).

Figure 4:
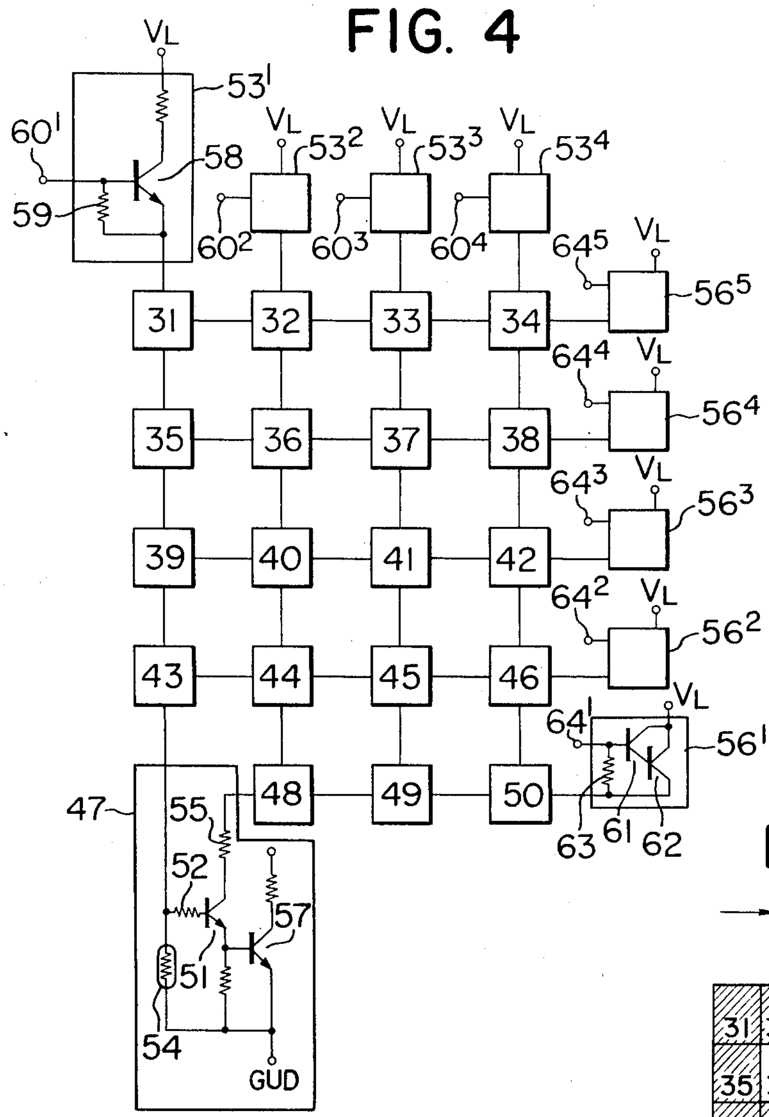
FIG. 4 is a block diagram for explanation of the thermal head with only some components illustrated in detail for clarity.
Figure 3:
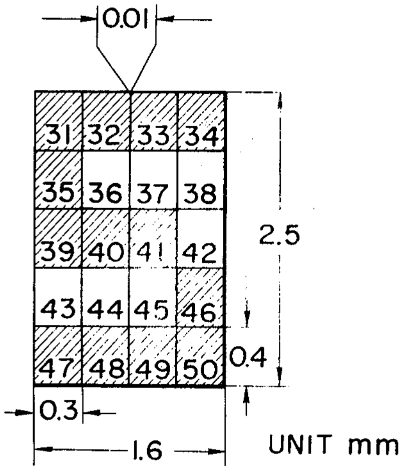
FIG. 3 is a schematic view for explanation of an array of dot elements in a thermal head, the selected dot elements being shown as being driven to print 5.

The count pulses from the print counter 20 are applied to the character generator 21 and the thermal head 22 whose arrangement is shown in detail in FIGS. 3 and 4. A print face shown in FIG. 3 which is made of silicon comprises 20 dots 31-50 arrayed in four columns and five rows. The print face has the dimensions of 1.6 mm in width and 2.5 mm in length whereas each dot has the dimensions of 0.3 mm in width and 0.4 mm in length. The dots are electrically insulated from one another with a spacing of 0.01 mm and are capable of being driven independently because each dot is arranged as a collector of a transistor. When driven, each dot is heated up to about 100°C.

In FIG. 4, each of dots 31-50 is represented by each block and the detail of one dot is shown in the block 47. The base of a transistor 51 is coupled through a resistor 52 to a column selection or drive circuit $\mathbf{53^1}$ and to a reference voltage source through a resistor 54. The collector is coupled through a resistor 55 to a row selection or drive circuit $\mathbf{56^1}$ and the emitter is coupled to the base of another transistor 57 and to the reference voltage source through a resistor. The collector of the transistor 57 is coupled to the reference voltage source.

The column and row selection or drive circuits $\mathbf{53^1}$ and $\mathbf{56^1}$ are adapted to apply appropriate voltages to the base and collector of the transistor 51 respectively so as to drive it. That is, only when the drive signals are simultaneously applied to the transistor 51 from both of the column and row selection circuits $\mathbf{53^1}$ and $\mathbf{56^1}$, the transistors 51 and 57 are turned on so that the collector current of the transistor 57 may flow. As a consequence the dot 47 which is the collector of the transistor 57 is heated. Other dots 31-50 have the similar construction as described above and are driven in the similar manner as described above.

The column selection or drive circuits $\mathbf{53^2}$-$\mathbf{53^4}$ have the arrangement as shown in the block $\mathbf{53^1}$ in which the collector of a transistor 58 is coupled to a constant voltage source $V_L$ and the base is coupled to the emitter through a resistor 59. The column selection or drive signal is derived from the emitter of the transistor 58 so as to select the blocks or dots 31, 35, 39, 43 and 47 in the leftmost column of the type face only when the column selection or drive signal is applied to the base of the transistor 58. That is, when the signal is applied to the base of the transistor 58, the current flows from the collector to the emitter and hence to the bases of the transistors such as 57 in the dots or blocks 31, 35, 39, 43 and 47.

The row selection or drive circuits $\mathbf{56^2}$ - $\mathbf{56^4}$ are similar in construction as shown at $\mathbf{56^1}$. Both of the collectors of transistors 61 and 62 are coupled to a constant voltage source $V_L$ and the base of the transistor 61 and the emitter of the transistor 62 are coupled to each other through a resistor 63. When the signal is applied to the terminal $\mathbf{64^1}$, both of the transistors 61 and 62 are turned on so that current flows from the collector to the emitter of the transistor 62 and hence to the collectors of the transistors in the blocks in the selected row. Signals applied to the terminals $\mathbf{64^5}$ - $\mathbf{64^1}$ of said row selection or drive circuit $\mathbf{56^5}$ - 56 are counter outputs PC0 - PC4 obtained from print counter 20 shown in FIG. 1, of which outputs PC0, PC1, PC2, PC3 and PC4 are applied to terminals $\mathbf{64^5}$, $\mathbf{64^4}$, $\mathbf{64^3}$, $\mathbf{64^2}$ and $\mathbf{64^1}$, respectively. The counter outputs are sequentially applied to the terminals $\mathbf{65^5}$ - $\mathbf{65^1}$. Thus, when the selected row and column circuits are turned on, the dot at the intersection of the selected row and column is driven or heated.

Figure 5:
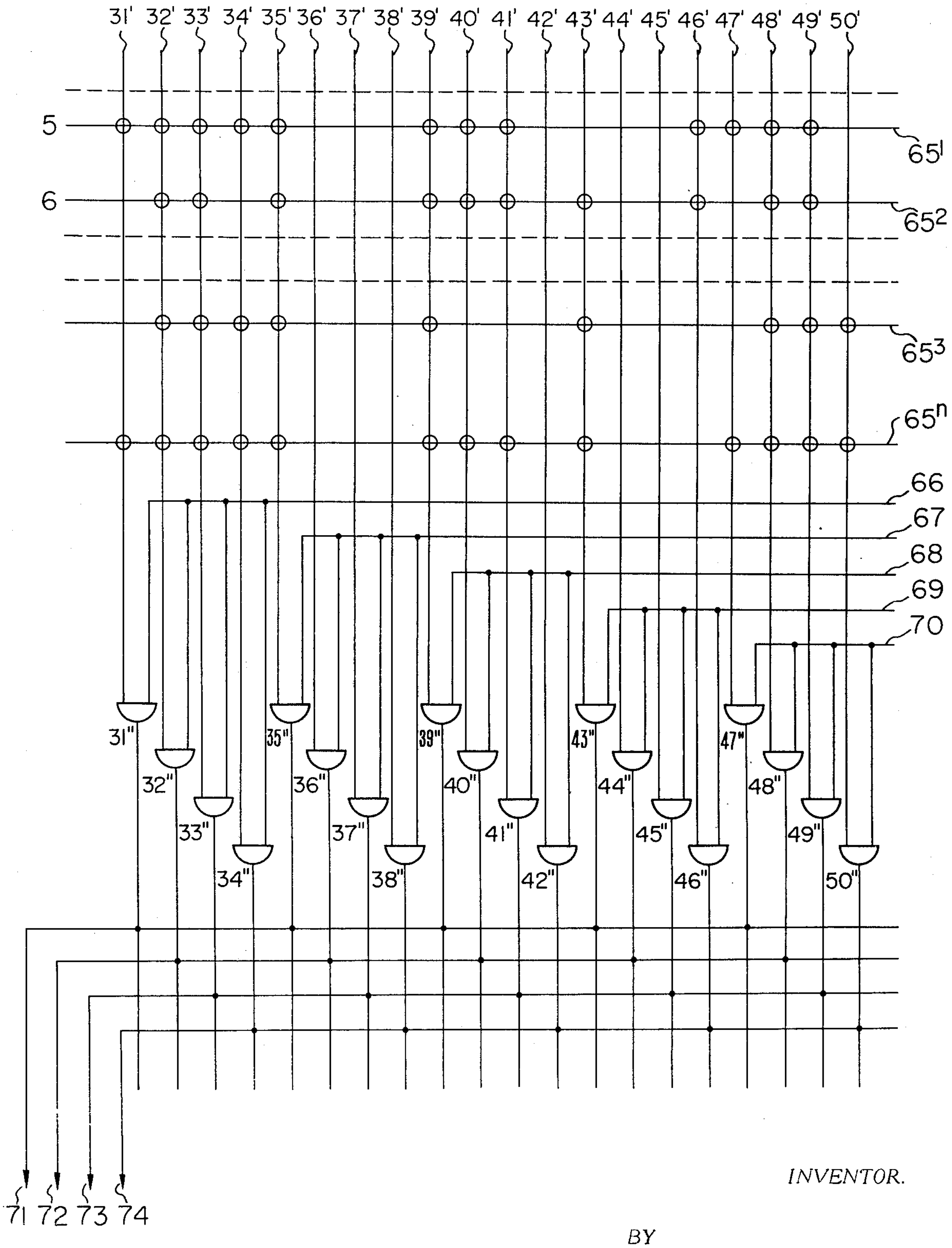
FIG. 5 is a diagram of a matrix circuit for selecting a predetermined combination of dot elements in the thermal head to drive them thereby printing a desired alphanumeric character.

The circuit of the character generator 21 is shown in FIG. 5. 31′ - 50′ designate drive lines for the dots 31-50 in the thermal head 22; and $\mathbf{65^1}$, $\mathbf{65^2}$ and up to $\mathbf{65^n}$ designate pattern selection lines which cooperate with the drivelines $\mathbf{31^1}$ - $\mathbf{50^1}$ to generate a pattern of a character to be printed. For this purpose, the pattern selection lines $\mathbf{65^1}$ - $\mathbf{65^n}$ are coupled through diodes at the respective crosspoints to determined drive lines 31″-50′. For example, to print 5 as shown in FIG. 3, the dots 31-34, 35, 39-41, 46-49 must be selected so that the pattern selection line $\mathbf{65^1}$ which selects 5 are coupled through the drive lines associated with the dots 31-35,

39-41, 46-49 as shown in FIG. 5. The diodes are denoted by small circles. To print 6, the dots 32, 33, 35, 39-41, 43, 46, 48 and 49 must be selected so that their associated drive lines 32', 33', 35', 39' - 41', 43', 46', 48' and 49' are coupled through diodes to the pattern selection line $65^2$ which selects 6. In a similar manner each pattern selection line is coupled through diodes to appropriate drive lines.

When the signal is applied to the pattern selection line $65^1$ for printing 5, it is also applied through the drive lines 31' - 35', 39' - 41', 46' - 49' to their associated AND gates 31'' - 35'', 39'' - 41'', 46'' - 49''. The AND gates 31'' - 50'' are divided into five groups each consisting of the AND gates associated in the same row. That is the first group consists of AND gates 31'' - 34''; the second group, 35'' - 38''; the third group, 39'' - 42''; the fourth group, 43'' - 46''; and the fifth group, 47'' - 50''. In order to apply the signal to all of the AND gates in the same group, signal lines 66-70 are provided. Counter outputs PC0 - PC4, which are derived from counter 20 shown in FIG. 1, are applied to the signal lines 66-70, of which outputs PC0, PC1, PC2, PC3 and PC4 are applied to the signal lines 66, 67, 68, 69 and 70, respectively. Thus the outputs may be derived from output lines 71-74 sequentially. More specifically, when the signal is applied to the signal line 66, the AND gates 31'' - 34'' provide the signals on the output lines 71-74. Next, when the signal is applied to the signal line 67, the AND gate 35'' alone outputs the signal on the output line 71. Similarly when the signal is applied to the signal line 68, the AND gates 39'' - 41'' output the signals on the output lines 71, 72 and 73. When the signal is applied to the signal line 69, only the AND gate 46'' outputs the signal on the output line 74. When the signal is applied to the signal line 70, the three AND gates 47'' - 49'' output the signals on the three signal output lines 71, 72 and 73.

These output lines 71-74 are connected to the terminals $60^1$ - $60^4$ of the column selection circuits $53^1$ - $53^4$ whereas the signal lines 66-70 are connected to the terminals $64^5$ - $64^1$ of the row selection circuits $56^5$ - $56^1$ respectively, so that the dots required for generating 5 are selected. More specifically, when the signal is applied to the signal line 66, the row selection circuit $56^5$ is turned on and the column selection circuits $53^1$ - $53^4$ are also turned on so that the dots 31-34 in the first row are all driven. When the signal is applied to the signal line 67, the dot 35 is driven in a similar manner. When the signal is applied to the signal line 68, the three dots 39-41 are driven. When the signal is applied to the signal line 69, the dot 46 in the fourth row is driven. When the signal is applied to the signal line 70, the three dots 47-49 in the fifth line are driven.

The signals to be sequentially applied to the signal lines 66-70 are the count outputs PC0-PC4 out of the count outputs from the print counter 20. That is, the output PC0 is applied to the signal line 66; PC1 to the line 67; PC2 to the line 68; PC3 to the line 69; and PC4 to the line 70. One printing cycle is equal to one cycle Tpc of the print counter 20 so that a time Tpc/10 is a time required to print by the selected dot or dots in one row. Therefore, it is seen that it takes a time $5 \times Tpc/10$ to print one character or 5 in the instant embodiment. The remaining time $4 \times Tpc/10$ is used for permitting the paper to move by one space for next printing and the remaining unit time Tpc/10 is used as an idle time.

The quantity of heat generated by a drive dot may be controlled by controlling the drive current applied to the dot. More specifically, the density of a character of 5 in the instant embodiment to be printed may be controlled by the magnitude of the drive current to be applied to the selected dots. This will be described in more detail with reference to FIG. 4. As described hereinabove, the dots are driven only when the signals from the row and column selection or drive circuits are simultaneously applied to the dots. In this case it is seen that the column selection circuits $53^1$ - $53^4$ remain turned on until one character or 5 is printed while the row selection circuits $56^1$ - $56^5$ are sequentially driven each for a time equal to 522 times the period of one clock pulse. Therefore the actuation time of the row selection circuits $56^1$-$56^5$ is varied by varying the frequency of the clock pulses, whereby the density of a character to be printed on the record medium may be varied. It is possible to use a thermally-sensitive record paper, as said record medium, such as the type 162 of thermally-sensitive record paper which can vary in the density thereof in response to the applied thermal quantity as manufactured by the 3M Company. In the instant embodiment, the frequency of the clock pulses generated by the pulse generated by the pulse generator 11 may be varied in the range from 30 kHz to 60 kHz so that a time required for printing by the selected dots in one row in the thermal head 22 may be changed in a range from $520/30 \times 10^3$ to $520/60 \times 10^3$ that is between 9 msec and 17 msec Therefore, the density may be varied accordingly. Even though the clock pulse frequency is directly varied as described above in order to adjust the density so that the operation time of the desk-top calculator is of course varied, the variation in operation speed will not cause any serious problem in practice.

We claim:

1. A device for controlling the printing density of characters to be printed upon thermosensitive paper by controlling the heating of a thermal head comprising:

signal generating means for generating a pulse signal train having a certain frequency;

frequency counting down means for counting down the frequency of the pulse signal train developed from said signal generating means;

count means for counting the pulse signals from said frequency counting down means;

character signal generating means (e.g. 21 in FIG. 1, and FIG. 5) responsive to the combination of output signals from said count means and a character instruction signal for generating character signals;

a thermal head having a plurality of thermal elements forming a character in a matrix configuration, said thermal head including driving means for driving sequentially each row line of the matrix in accordance with the output signals from said count means and simultaneously driving the selected column lines of the matrix in accordance with the output signals from said character signal generating means to heat the thermal elements provided at the intersection of the driven row and column lines; and control means for controlling the amount of current through the selected thermal elements by varying the frequency of the pulse signal train from said signal generating means, thereby controlling the heating of the thermal elements.

2. A device according to claim 1 wherein said frequency counting down means comprise a plurality of counters each of which is interconnected to the others in cascade configuration.

3. A device according to claim 1 wherein said character signal generating means comprise character information generating means for generating character information to select all thermal elements needed to form a selected character in response to the character instruction signal, and character information reading out means for partially reading out the generated character information in the row unit of the thermal elements matrix.

* * * * *